(12) United States Patent
Lovatt

(10) Patent No.: US 6,896,714 B2
(45) Date of Patent: May 24, 2005

(54) FORMULATION OF PHOSPHORUS FERTILIZER FOR PLANTS

(75) Inventor: Carol J. Lovatt, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/686,411

(22) Filed: Oct. 14, 2003

(65) Prior Publication Data

US 2004/0226328 A1 Nov. 18, 2004

Related U.S. Application Data

(63) Continuation of application No. 10/341,966, filed on Jan. 13, 2003, now Pat. No. 6,645,268, which is a continuation of application No. 09/637,621, filed on Aug. 11, 2000, which is a continuation of application No. 09/126,233, filed on Jul. 30, 1998, now Pat. No. 6,113,665, which is a continuation of application No. 08/642,574, filed on May 3, 1996, now Pat. No. 5,830,255, which is a continuation of application No. 08/192,508, filed on Feb. 7, 1994, now Pat. No. 5,514,200.

(51) Int. Cl.$^7$ .............................. C05B 15/00
(52) U.S. Cl. .................. 71/11; 71/27; 71/32; 71/41; 71/64.1
(58) Field of Search ................. 71/11, 27, 32, 71/41, 64.1

(56) References Cited

U.S. PATENT DOCUMENTS

| 5,514,200 | A | * | 5/1996 | Lovatt | 71/11 |
| 5,830,255 | A | * | 11/1998 | Lovatt | 71/11 |
| 6,113,665 | A | * | 9/2000 | Lovatt | 71/11 |
| 6,645,268 | B2 | * | 11/2003 | Lovatt | 71/11 |

OTHER PUBLICATIONS

Robertson et al, "Orthophosphite as a Buffer for Biological Studies", Archives of Biochemistry and Biophysics (1956), vol. 62, pp. 396–401. (no month).*

* cited by examiner

*Primary Examiner*—Wayne A. Langel
(74) *Attorney, Agent, or Firm*—Morgan, Lewis & Bockius LLP

(57) ABSTRACT

Concentrated phosphorus fertilizers are disclosed that comprise a buffered composition of an organic acid and salts thereof and a phosphorous-containing acid and salts thereof. The concentrated phosphorus fertilizers can be diluted with water of pH ranging from about 6.5 to about 8.5 at ratios of concentrate to water at about 1:40 to about 1:600 to result in a fertilizer having a pH in the range acceptable for foliar uptake of phosphorus.

108 Claims, No Drawings

FORMULATION OF PHOSPHORUS FERTILIZER FOR PLANTS

This is a continuation of U.S. application Ser. No. 10/341,966 now Pat. No. 6,645,268, filed Jan. 13, 2003, which is a continuation of U.S. application Ser. No. 09/637,621, filed Aug. 11, 2000, which is a continuation of U.S. application Ser. No. 09/126,233, filed Jul. 30, 1998, now U.S. Pat. No. 6,113,665, which issued Sep. 5, 2000, which is a continuation of U.S. application Ser. No. 08/642,574, filed May 3, 1996, now U.S. Pat. No. 5,830,255, which issued Nov. 3, 1998, which application was re-examined as B1 5,830,255 (certificate issued Jul. 11, 2000), which is a continuation of U.S. application Ser. No. 08/192,508, filed Feb. 7, 1994, now U.S. Pat. No. 5,514,200, which issued May 7, 1996.

BACKGROUND OF THE INVENTION

Fertilizers are added to the soil of crops or in some cases they can be applied directly to crop foliage to supply elements needed for plant nutrition. Seventeen elements are known to be essential to the health and growth of plants. Typically, nitrogen, phosphorus, and potassium are provided in the greatest quantity. With increasing knowledge of the role of each of the nutrients essential to plants, there is a better understanding of the importance of providing a given nutrient at the appropriate stage of phenology. To accomplish this, rapid changes in fertilizer formulations and methods of application have been necessary.

Another factor changing fertilization formulations and methods is due to pressure from federal, state and local regulatory agencies and citizen groups to reduce the total amount of fertilizer in general, and of specific nutrients in particular, being applied to the soil. Additionally, the loss of registration of existing synthetic plant growth regulators and organic pesticides and the prohibitively high costs involved in the successful registration of new ones, also plays a role in the changing arena of crop fertilization.

The principal source of phosphorus for the fertilizer industry is derived from the ores of phosphorus-containing minerals found in the Earth's crust, termed phosphate rock. Elemental phosphorus does not exist in nature; plants utilize phosphorus as the dihydrogen phosphate ion ($H_2PO_4^-$). While untreated phosphate rock has been used for fertilizer, it is most commonly acidulated with dilute solutions of strong mineral acids to form phosphoric acid, which is more readily absorbed by crops.

Until recently, phosphate and polyphosphate compounds were considered the only forms in which phosphorus could be supplied to plants to meet the plant's nutritional need for phosphorus. Indeed, the only phosphite compound cited for use as a fertilizer in the *Merck Index* (M. Windhols, ed., 1983, 10th edition, p. 1678) is calcium phosphite ($CaHPO_3$). No phosphite fertilizer formulations are listed in *The Farm Chemical Handbook* (Meister Publishing Co., 1993, Willoughby, Ohio 834 p.) or *Western Fertilizer Handbook* (The Interstate, Danville, Ill. 288 p.) Historically, calcium phosphite was formed as a putative contaminant in the synthesis of calcium superphosphate fertilizers [McIntyre et al., *Agron. J.* 42:543–549 (1950)] and in one case, was demonstrated to cause injury to corn [Lucas et al., *Agron. J.* 71:1063–1065 (1979)]. Consequently, phosphite was relegated for use only as a fungicide (Alliete®; U.S. Pat. No. 4,075,324) and as a food preservative.

More recently, it has been shown that plants can obtain phosphorus from phosphite [Lovatt, C. J., Mar. 22, 1990, "Foliar phosphorus fertilization of citrus by foliar application of phosphite" In: Citrus Research Advisory Committee (eds) Summary of Citrus Research, University of California, Riverside, Calif. pp 25–26; Anon., May, 1990, "Foliar applications do double duty" In: L. Robison (ed) Citrograph Vol. 75, No. 7, p 161; Lovatt, C. J., 1990, "A definitive test to determine whether phosphite fertilization can replace phosphate fertilization to supply P in the metabolism of 'Hass' on 'Duke 7':—A preliminary report" California Avocado Society Yearbook 74:61–64; Lovatt, C. J., 1992]. Formulations based on phosphorous acid and hypophosphorous acid, as phosphite is, generally undergo oxidation to phosphate and thus lose the benefits that could be derived from the use of phosphite fertilization applications.

The phosphate and polyphosphate fertilizers currently used have a number of properties that compromise their desirability as fertilizers. Generally, they tend to form precipitates during storage and shipping. This limits the ability to formulate concentrated solutions of fertilizers. Additionally, formulations must generally be maintained at a narrow pH range to prevent precipitation, resulting in fertilizers that are limited to particular uses.

Another drawback of phosphate fertilizers is that they are not readily taken up by the foliage of many plants and must instead be delivered to the soil for uptake by plant roots. The mobility of phosphate fertilizers in the soil is limited leading to rapid localized depletion of phosphorus in the rhizosphere and phosphorus deficiency of the plant. Frequent reapplication of phosphate fertilizers is undesirable because it leads to leaching of phosphate into the groundwater resulting in eutrophication of lakes, ponds and streams.

Phosphate and polyphosphate fertilizers have also been shown to inhibit the beneficial symbiosis between the roots of the plants and mycorrhizal fungi. They tend to support the growth of algae and promote bacterial and fungal growth in the rhizosphere, including the growth of pathogenic fungi and other soil-borne pests.

Even though phosphorus, once in the plant, is very phloem mobile (i.e. readily moving from old leaves to young tissues), phosphate is poorly absorbed through the leaves of most plant species. This is unfortunate because successful foliar phosphorus feeding would result in the application of less phosphate fertilizers to the soil and reduce phosphorus pollution of the ground water.

Accordingly, there is a need for a phosphorus fertilizer that can be utilized in irrigation systems and applied to foliage without the formation of precipitates that reduce nutrient availability and uptake by the plant and plug emitters and sprayers. There is also a need for new methods of fertilizer application that allow nutrients in a readily available form to be supplied at the exact time the plant needs them. This need includes the facility of a foliar product to be sold in a single formulation for use as a concentrated material for airplane or helicopter application or as a dilute solution for ground spray application and yet able to be maintained at a suitable pH range optimal for leaf uptake despite the need to be diluted prior to application.

Additionally, there is a demand for phosphorus fertilizers that have the facility to be used as liquids or solids (granule or powder). There is also a demand for fertilizers that do more than just supply nutrients. It is desired that the fertilizers also have demonstrated plant growth regulator activity, increase the plants' resistance to pests, promote plant health in general and root health in particular, increase the production of allelopathic compounds, increase pre- and post-harvest quality, improve stress tolerance, enhance beneficial symbioses, and improve yield over existing traditional soil or foliar fertilizers.

SUMMARY OF THE INVENTION

Given the above-mentioned deficiencies and demands of fertilizers in general, and of phosphorus fertilizers in particular, it is an object of the present invention to provide phosphorus to plants in a formulation that renders phosphorus readily available to the plants under a number of application methods such as through soil, foliar uptake, irrigation, and other methods.

It is also an object that the phosphorus fertilizer formulations be conveniently formulated in concentrated solutions that are stable during storage and shipping.

Another object of the present invention is to provide a phosphorus fertilizer that is not as inhibitory to mycorrhizal fungi as traditional phosphate fertilizers.

It is a further object of the present invention to provide a phosphorus fertilizer that does not support the growth of algae to the same degree that traditional phosphate fertilizers do.

Additional objects and features of the invention will be apparent to those skilled in the art from the following detailed description and appended claims.

The above objects and features are accomplished by a concentrated phosphorus fertilizer comprising a buffered composition comprising an organic acid and salts thereof and a phosphorous-containing acid and salts thereof. The concentrated phosphorus fertilizer can be diluted with water of pH ranging from about 6.5 to about 8.5 at ratios of concentrate to water at about 1:40 to about 1:600 to result in a fully solubilized fertilizer having a pH in a range acceptable for foliar uptake of phosphorus.

In one embodiment, the phosphorous-containing acid is selected from the group consisting of phosphorous acid, hypophosphorous acid, polyphosphorous acid, and polyhypophosphorous acid and the organic acid is preferably selected from the group consisting of dicarboxylic acids and tricarboxylic acids such as citrate.

In one embodiment, the concentrated phosphorus fertilizer is an essentially clear liquid devoid of precipitate that can be diluted at a ratio of about 1:40 to about 1:600 with water having pH of about 6.5 to about 8.5, to result in a fertilizer having a pH of about 5.0 to about 7.0, and more preferably from about 5.5 to about 6.5, to facilitate the uptake of phosphorus by a variety of plants.

A method of providing phosphorus to plants is also disclosed. The method comprises diluting a concentrated phosphorus fertilizer comprising a buffered composition comprising an organic acid and salts thereof and a phosphorous-containing acid and salts thereof with water to form a substantially fully solubilized use-dilution fertilizer having a pH in a range acceptable for foliar uptake of phosphorus, and applying the fertilizer to the plant foliage.

DETAILED DESCRIPTION OF THE INVENTION

The present invention provides phosphorus fertilizers essentially devoid of phosphate. The fertilizer comprises a double or multiple buffer system of organic acids and their salts with a phosphorous-containing acids and their salts. The formulation stabilizes the phosphorous against oxidation to phosphate. Suitable phosphorous-containing acids are phosphorous acid and polyphosphorous acid, based generally on the formula $H_3PO_3$, and hypophosphorous acid and polyhypophosphorous acid, based generally on the formula $H_3PO_2$. Phosphite, the salt of phosphorous acid, has properties that are known to be beneficial to crop production. It is taken up through the foliage of avocado and citrus, two species which classically do not take up phosphate through their foliage. Phosphite has fungicidal properties with regard to some species of pathogenic fungi: *Rhizoctonia solani, Botrytis cinerea, Piricularia oryzae, Plasmopora viticola, Phytophthora cinnamomi*, and *Phytophthora parasitica*. Recently, it has been demonstrated that phosphite also serves as a source of metabolically active phosphorus in plants. The properties of phosphite that make it desirable as a fertilizer are enhanced when it is formulated according to the present invention as a double or multiple buffer with phosphorous acid, hypophosphorous acid, polyphosphorous acid and/or polyhypophosphorous acid and their respective salts and organic acids and their salts per this invention.

Suitable organic acids have the formula R—COOH or R—COO$^-$ where R is hydrogen or a carbon-containing molecule or group of molecules. Suitable organic acids are those that maintain the phosphite ion in a substantially fully solubilized form upon dilution with water at pH varying from about 6.5 to about 8.5 and that result in a use-dilution fertilizer having a foliage acceptable pH for phosphorus uptake. Preferred organic acids are dicarboxylic and tricarboxylic acids.

By the term "substantially fully solubilized" it is meant that upon dilution, the phosphite does not precipitate, or at least not appreciably, so as to affect administration of the liquid product to the plant foliage, and thus is in a form available to the plant. With present phosphite fertilizers, there is a tendency for phosphite to precipitate if diluted with alkaline water, thereby rendering the phosphite in a form that is unavailable to the plant for uptake.

By the term "foliage-acceptable pH for phosphorus uptake", it is meant a pH that allows phosphorus to be absorbed by the plant without causing damage to the foliage. A foliage-acceptable pH for phosphorus uptake usually ranges between about 5.0 to about 7.0, and preferably between about 5.5 to about 6.5. Phosphorus is most readily taken up by foliage at pH 6.0. Depending on the plant species, a pH below 5.0 can cause damage to leaves and/or the flowers and/or fruit. At higher pH, between about 7.0 to about 7.5, there is reduced uptake of nutrients, although generally there is no plant damage. A pH between about 7.5 and 8.0, depending on the plant species, plant damage may result. A pH greater than 8.0, generally causes damage to the plant in addition to reducing uptake of the nutrients. Accordingly, suitable organic acids are those that help provide a "buffered composition" having the desired pH range. This means that a "use-dilution fertilizer" having an acidic to neutral pH (pH 5.0 to 7.0) can be achieved upon high dilutions (up to about 1/600) of the concentrated fertilizer with highly alkaline water (up to a pH of about 8.5).

Organic acids that meet this criteria include but not limited to intermediates in the Kreb's Tricarboxylic Acid Cycle, amino acids such as glutarmic acid and aspartic acid, vitamin acids such as ascorbic acid and folic acid, and their respective salts. Particularly preferred organic acids are dicarboxylic and tricarboxylic acids selected from the group consisting of citrate, pyruvate, succinate, fumarate, malate, formate, oxaloacetate, citrate, cis-aconitate, isocitrate, and α-ketoglutarate. Citrate is a particularly preferred organic acid because of it is relatively inexpensive and readily available.

These formulations allow the maintenance of continued solubility, and thus availability for uptake by plants, of phosphorus, with or without other nutrients, over a significantly wide range of concentrations and pHs. The increased solubility of these formulation over that of phosphate or phosphite fertilizers makes it possible to prepare fertilizers with a greater concentration of phosphorus per unit volume than traditional phosphate or polyphosphate fertilizers or the simple unbuffered salts of phosphorous acid recently being marketed as fertilizers for foliar application which are available as super saturated solutions with only about 16% phosphite, and which are diluted approximately 1:100 to about 1:300. The resulting pH of these fertilizers varies significantly depending upon the pH of the water used, thus affecting the availability of the nutrients for foliar uptake. In contrast, the highly concentrated fertilizers of the present invention, which can be diluted with water at a ratio of about 1:600, allow for more cost effective shipping, handling, and application. They result in greater uptake of phosphorus by the canopy of plants than traditional phosphate or recent phosphite fertilizers not formulated in this manner.

The formulations provided herein also make it possible to formulate various combinations of other essential plant nutrients or other inorganic or organic compounds as desired and maintain their solubility when used over a wide range of concentrations and pHs, which is not possible for present phosphate or phosphite fertilizers. For example, boron, manganese, calcium, iron and other elements can be provided at relatively high concentrations in these formulations. Thus, these phosphorus fertilizers also enhance the canopy uptake of other mineral nutrients essential to plants. They can be used as a canopy application to improve pre- and post-harvest crop quality.

Formulations can also prepared with copper. However, when high concentrations of copper are used, the copper is not fully solubilized. In this situation, the insoluble copper is desirable as it prevents rapid uptake of the copper and thus minimizes the potential for copper toxicity. As the insoluble copper is rewetted over night by dew, dissolution occurs so that additional copper is taken up. The buffering capacity of the formulation maintains the pH at a foliage-acceptable pH when the insoluble copper is rewetted so that conditions are optimal for uptake and are benign to the plant tissues. While copper is an element essential to plants, it is required in only small amounts. In relation to nitrogen, plants require, in general, 10,000- to 75,000-fold less copper. Provided to the foliage of the plant at the rate provided by this formulation, copper is a very effective fungicide, in addition to being a plant nutrient and fertilizer.

In addition to the above-mentioned advantages, the formulations disclosed have a direct benefit to the environment. Because the formulations allow successful foliar feeding of phosphorus to a number of plants that do not effectively take up phosphorus when supplied in phosphate or polyphosphate forms, and because these formulations enhance the uptake of other nutrients, they are cost-effective and can replace less efficient, traditional soil-feeding methods. This results in reducing phosphate pollution of the groundwater and eutrophication of freshwater ponds, lakes and streams.

The phosphorus fertilizers disclosed herein can also be advantageously applied through the soil or by irrigation systems as solid (granular) or liquid formulations. These formulations can be used at pHs sufficiently low to clean irrigation lines and alter the pH of the soil to solve alkalinity problems while supplying essential nutrients to plants. Example 2, below discloses a suitable formulation for irrigation application. With irrigation application, the fertilizer flowing through the irrigation system will typically have a pH lower than about 2.5, usually less than about pH 1.5. The low pH is designed to supply phosphorus while killing bacteria and algae (slime) which plug irrigation lines, thus cleaning the lines. The low pH also dissolves calcium carbonate deposits at and around the emitters, and solubilizes the calcium carbonate so $Ca^{2+}$ is available to the plant. Once delivered to the soil near the plant, sufficient water is applied to achieve a pH suitable for phosphorus uptake by the plant. The form in which the phosphorus is supplied in these formulations is more mobile than phosphate fertilizers or than the simple salts of phosphorous acid recently being sold as fertilizers, and thus more available and more readily taken up by the roots of plants. An advantage of these formulations is that the form in which phosphorus is supplied does not inhibit the development of mycorrhizal fungi to the same degree that traditional phosphate fertilizers do. The present compositions can also be formulated with certain nutrients in addition to phosphorus that are readily absorbed through soil applications at pH of about 5.5 to about 7.0. Such nutrients include nitrogen, calcium, magnesium, potassium, molybdenum, boron, and sulfur.

Another advantage with the phosphorus fertilizers disclosed herein is that they do not support the growth of green algae to the same degree that traditional phosphate fertilizers do. This is of significant importance to agriculture, commercial nurseries, the ornamental and cut flower industry, and the home and garden industry, as it will prevent the growth of green algae which typically proliferate and plug irrigation emitters, foul pots and benches, and provide a niche for the growth of pathogenic bacteria and fungi. These formulations also endow the phosphorus fertilizer with anti-viral, anti-bacterial and anti-fungal activity. This bacterialcidal activity in a phosphorus fertilizer makes it possible to use this fertilizer to inhibit ice-nucleating bacteria to thus protect plants from frost damage.

Methods of Preparation

The phosphorus fertilizers are prepared by first forming solutions of the phosphorous and organic acids. Other desired nutrients can then be added with constant stirring. The amount of phosphorous relative to organic acid is not critical, as long as appropriate buffering and solubility are achieved. Generally the amount of organic acid that is added will depend upon the form in which the nutrient elements are added. For example, if calcium is to be added in the form of calcium hydroxide (a base), then the acid form of the organic acid, for example citric acid, would be used rather than its salt, citrate. In addition to the desired nutrients, other additives, that are known in the fertilizer industry, can be added. These include, for example, wetting-agents, surfactants, spreaders, stickers etc., and are described in *The Farm Chemical Handbook*, supra (incorporated herein by reference). The fertilizer compositions can also be prepared as solid formulations, identical to the liquid ones by simply leaving out all of the water. The properties are the same as the liquid formulations but have the additional advantage of weighing less for the same amount of nutrient.

Methods of Application

The fertilizer is applied according to crop-specific recommendations which will depend upon the application method (foliar, soil, irrigation, etc.), time of application, rate of application, and product formulation. Crops that will benefit from the fertilizer include, but are not limited to, avocado, citrus, mango, coffee, deciduous tree crops, grapes and other berry crops, soybean and other commercial beans, corn, tomato, cucurbits and cucumis species, lettuce, potato, sugar beets, peppers, sugarcane, hops, tobacco, pineapple, coconut palm and other commercial and ornamental palms, hevea rubber, and ornamental plants.

In addition to the foliar, soil, and irrigation application methods mentioned above, the present fertilizer may prove beneficial to certain crops through other application methods. For example, trunk paints or other methodologies may provide for a continuous low supply of fertilizers, such as, for example, "intravenous" feeding as practiced in the boron nutrition of soybeans.

In order that the invention described herein may be more fully understood, the following examples are set forth. All chemicals used were of analytical reagent quality and approximately 100% by weight unless otherwise specified. All formulations are expressed in terms of weight to volume. It should be understood that these examples are for illustrative purposes only and are not to be construed as limiting the scope of the invention in any manner.

EXAMPLE 1

A formulation was prepared of 1 gallon of 0-40-0 fertilizer with 3.86 lbs $H_3PO_3$, 1.34 lbs tripotassium citrate, 1.34 lbs of trisodium citrate, and 4.0 lbs of 58% ammonium hydroxide. The components were dissolved in water with constant stirring. This single formulation can be used at a rate of 2 quarts in as little as 20 gallons of water of pH 6.5 to 8.5 up to 300 gallons of water of pH 6.5 to 8.5 and maintain a pH between 5.5 to 6.5 without the formation of any precipitate.

EXAMPLE 2

A formulation was prepared of 1 gallon of 0-40-0 fertilizer with 3.86 lbs $H_3PO_3$ and 0.5 lbs citric acid. This formulation is stable at pH 1.0 or less and is designed for application through the irrigation system. It is stable against oxidation and precipitation when supplied through the irrigation water.

EXAMPLE 3

A formulation was prepared of 1 gallon of 0-30-0 fertilizer with 74.89% elemental boron with 2.89 lbs $H_3PO_3$, 28.67 lbs borax ($Na_2B_4O_7 \cdot 10H_2O$), 17.16 lbs boric acid ($H_3BO_3$), 1.54 lbs $H_2SO_4$ and 2.67 lbs citric acid. A solution of the phosphorous and citric acid was first prepared, then the other elements were added with constant stirring. This formulation can be used at the rate of 2 quarts in as little as 20 gallons of water of pH between 6.5 to 8.5 up to 300 gallons of water of pH 6.5 to 8.5 and maintain a pH between 5.5 to 6.5 without the formation of any precipitate.

EXAMPLE 4

A formulation was prepared of 1 gallon of 0-30-0 fertilizer with 21.57% Zn and 23.22% Mn with 2.89 lbs of $H_3PO_3$, 7.92 lbs $ZnSO_4$, 7.16 lbs $Mn(H_2PO_2)_2 \cdot H_2O$, 0.61 lbs citric acid and 0.87 lbs 58% $NH_4OH$. This formulation can be used at the rate of two quarts in as little as 20 gallons of water of pH between 6.5 to 8.5 up to 300 gallons of water of pH between 6.5 to 8.5 and maintain a pH between 5.5 to 6.5 without the formation of any precipitate.

EXAMPLE 5

A formulation was prepared of 1 gallon of 0-30-0 fertilizer with 5.4% Ca. It was packaged in a two-container system where 1 gallon of solution A contained 2.89 lbs $H_3PO_3$, 0.68 lbs $Ca(OH)_2$, and 0.28 lbs citric acid, and 1 gallon of solution B contained 0.16 lbs $Ca(OH)_2$, 0.60 lbs KOH, 3.34 lbs 58% $NH_4OH$, 0.28 lbs citric acid, and 0.67 lbs EDTA (ethylenediaminetetraacetic acid). Two quarts of solution A can be added to as little as 20 gallons of water of pH between 6.5 to 8.5 up to 300 gallons of water of pH between 6.5 to 8.5 followed by the addition of two quarts of solution B. The final solution is between pH 5.5 to 6.5 and without precipitation.

A formulation of 1 gallon of 0-30-0 fertilizer with 4.32% Ca can be made without requiring EDTA. This formulation is also packaged in a two-container system where 1 gallon of solution A contains 2.89 lbs $H_3PO_3$, 0.67 lbs $Ca(OH)_2$ and 0.28 lbs of citric acid, while 1 gallon of solution B contains 2.67 lbs of 58% $NH_4OH$, 0.6 lbs KOH. Two quarts of solution A can be added to as little as 20 gallons of water of pH between 6.5 to 8.5 up to 300 gallons of water of pH between 6.5 and 8.5 followed by the addition of two quarts of solution B. The final pH of the solution is between 5.5 and 6.5 and without precipitation.

EXAMPLE 6

A formulation was prepared of 1 gallon of 0-30-30 fertilizer with 2.89 lbs $H_3PO_3$, 2.99 lbs KOH, and 0.84 lbs citric acid. Two quarts can be added to as little as 20 gallons of water of pH between 6.5 to 8.5 and up to 300 gallons of water of pH between 6.5 and 8.5. The pH of the final solution is between 5.5 and 6.5 without precipitation.

EXAMPLE 7

A formulation was prepared of 1 gallon of 0-30-0 fertilizer having 4.8% iron with 2.89 $H_3PO_3$, 1.75 lbs iron-citrate, 0.74 lbs KOH, 0.62 lbs NaOH, and 2.00 lbs of 58% $NH_4OH$. Two quarts of the formulation can be added to as little as 20 gallons of water pH 6.5 to 8.5 and up to 300 gallons of water of pH 6.5 to 8.5. The pH of the final solution is between 5.5 to 6.7 without precipitation.

EXAMPLE 8

A formulation was prepared of 1 gallon of 0-30-0 fertilizer having 23.22% manganese with 2.89 $H_3PO_3$, 7.16 lbs. $Mn(H_2PO_2)_2$, and 0.133 lbs. sodium citrate. Two quarts of the formulation can be added to as little as 20 gallons of water pH 6.5 to 8.5 and up to 300 gallons of water of pH 6.5 to 8.5. The pH of the final solution is between 5.5 to 6.5 without precipitation.

EXAMPLE 9

A formulation was prepared of 1 gallon of 0-30-0 fertilizer having 57% copper with 2.89 $H_3PO_3$, 7.3 lbs $Cu(OH)_2$ (57% Cu), and 1.34 lbs of 58% $NH_4OH$. Two quarts can be added to as little as 20 gallons of water of pH 6.5 to 8.5 up to 300 gallons of water of pH 6.5 to 8.5. The pH of the final solution is between 5.5 to 6.5. The copper is not fully soluble, however this is desirable in that it prevents the rapid uptake of copper when applied to plant foliage.

What is claimed is:

1. A method of providing phosphorus to a plant, said method comprising:

(a) mixing water, at least one organic acid or salt thereof, and a formulation comprising at least one phosphorous-containing acid or salt thereof which is present in said formulation in an amount of from about 30 to about 40 percent (wt/vol), thus forming a phosphorus fertilizer that is buffered, substantially fully solubilized, and has a foliage-acceptable pH for phosphorus uptake; and (b) applying said phosphorus fertilizer to the foliage of said plant.

2. The method of claim 1, wherein said mixing comprises:
   (1) diluting said formulation with said water; and
   (2) mixing said organic acid or salt thereof and the product of step (1).

3. The method of claim 1, wherein said mixing comprises:
   (1) diluting said organic acid or salt thereof with said water; and
   (2) mixing said formulation and the product of step (1).

4. The method of claim 1, wherein said mixing comprises:
   (1) diluting said organic acid or salt thereof with said water;
   (2) diluting said formulation with said water; and
   (3) mixing the product of step (1) and the product of step (2).

5. The method of claim 1, wherein said phosphorus fertilizer has a pH of 5.0 to 7.0.

6. The method of claim 1, wherein said mixing further comprises: adjusting the pH of said phosphorus fertilizer to between about 5.0 and about 7.0.

7. A method of providing phosphorus to a plant, said method comprising:
   (a) mixing water, at least one organic acid or salt thereof, and a formulation comprising at least one phosphorous-containing acid or salt thereof which is present in said formulation in an amount of about 30 percent (wt/vol) or greater, thus forming a phosphorus fertilizer that is buffered, substantially fully solubilized, and has a foliage-acceptable pH for phosphorus uptake; and
   (b) applying said phosphorus fertilizer to the foliage of said plant.

8. The method of claim 7 wherein said mixing comprises:
   (1) diluting said formulation with said water; and
   (2) mixing said organic acid or salt thereof and the product of step (1).

9. The method of claim 7, wherein said mixing comprises:
   (1) diluting said organic acid or salt thereof with said water; and
   (2) mixing said formulation and the product of step (1).

10. The method of claim 7, said mixing comprises:
    (1) diluting said organic acid or salt thereof with said water;
    (2) diluting said formulation with said water; and
    (3) mixing the product of step (1) and the product of step (2).

11. The method of claim 7, wherein said phosphorus fertilizer has a pH of 5.0 to 7.0.

12. The method of claim 7, wherein said mixing further comprises: adjusting the pH of said phosphorus fertilizer to between about 5.0 and about 7.0.

13. A method of providing phosphorus to a plant, said method comprising:
    (a) mixing water, at least one organic acid or salt thereof, and a formulation comprising at least one phosphorous-containing acid or salt thereof, wherein said formulation comprises phosphorus in an amount equivalent to from about 0.30 kg/L to about 0.40 kg/L $P_2O_5$, thus forming a phosphorus fertilizer that is buffered, substantially fully solubilized, and has a foliage-acceptable pH for phosphorus uptake; and
    (b) applying said phosphorus fertilizer to the foliage of said plant.

14. The method of claim 13, wherein said mixing comprises:
    (1) diluting said formulation with said water; and
    (2) mixing said organic acid or salt thereof and the product of step (1).

15. The method of claim 13, wherein said mixing comprises:
    (1) diluting said organic acid or salt thereof with said water; and
    (2) mixing said formulation and the product of step (1).

16. The method of claim 13, wherein said mixing comprises:
    (1) diluting said organic acid or salt thereof with said water;
    (2) diluting said formulation with said water; and
    (3) mixing the product of step (1) and the product of step (2).

17. The method of claim 13, wherein said phosphorus fertilizer has a pH of 5.0 to 7.0.

18. The method of claim 13, wherein said mixing further comprises:
    adjusting the pH of said phosphorus fertilizer to between about 5.0 and about 7.0.

19. A method of providing phosphorus to a plant, said method comprising:
    (a) mixing water, at least one organic acid or salt thereof, and a formulation comprising at least one phosphorous-containing acid or salt thereof, wherein said formulation comprises phosphorus in an amount equivalent to about 0.30 kg/L or greater $P_2O_5$, thus forming a phosphorus fertilizer that is buffered, substantially fully solubilized, and has a foliage-acceptable pH for phosphorus uptake; and
    (b) applying said phosphorus fertilizer to the foliage of said plant.

20. The method of claim 19, wherein said mixing comprises:
    (1) diluting said formulation with said water; and
    (2) mixing said organic acid or salt thereof and the product of step (1).

21. The method of claim 19, wherein said mixing comprises:
    (1) diluting said organic acid or salt thereof with said water; and
    (2) mixing said formulation and the product of step (1).

22. The method of claim 19, wherein said mixing comprises:
    (1) diluting said organic acid or salt thereof with said water;
    (2) diluting said formulation with said water; and
    (3) mixing the product of step (1) and the product of step (2).

23. The method of claim 19, wherein said phosphorus fertilizer has a pH of 5.0 to 7.0.

24. The method of claim 19, wherein said mixing further comprises:
    adjusting the pH of said phosphorus fertilizer to between about 5.0 and about 7.0.

25. A method of providing phosphorus to a plant, said method comprising:
    (a) mixing water, at least one organic acid or salt thereof, and a formulation comprising at least one phosphite-containing compound, wherein said formulation comprises phosphorus in an amount equivalent to about 0.30 kg/L or greater $P_2O_5$, thus forming a phosphite fertilizer that is buffered, substantially fully solubilized, and has a foliage-acceptable pH for phosphorus uptake; and (b) applying said phosphite fertilizer to the foliage of said plant.

26. The method of claim 25, wherein said mixing comprises:
   (1) diluting said formulation with said water; and
   (2) mixing said organic acid or salt thereof and the product of step (1).

27. The method of claim 25, wherein said mixing comprises:
   (1) diluting said organic acid or salt thereof with said water; and
   (2) mixing said formulation and the product of step (1).

28. The method of claim 25, wherein said mixing comprises:
   (1) diluting said organic acid or salt thereof with said water;
   (2) diluting said formulation with said water; and
   (3) mixing the product of step (1) and the product of step (2).

29. The method of claim 25, wherein said phosphite fertilizer has a pH of 5.0 to 7.0.

30. The method of claim 25, wherein said mixing further comprises:
   adjusting the pH of said phosphite fertilizer to between about 5.0 and about 7.0.

31. A method of providing phosphorus to a plant, said method comprising:
   (a) mixing water, at least one organic acid or salt thereof, and a formulation comprising at least one phosphite-containing compound, wherein said formulation comprises phosphorus in an amount equivalent to from about 0.30 kg/L to 0.40 kg/L or greater $P_2O_5$, thus forming a phosphorus fertilizer that is buffered, substantially fully solubilized, and has a foliage-acceptable pH for phosphorus uptake; and
   (b) applying said phosphite fertilizer to the foliage of said plant.

32. The method of claim 31, wherein said mixing comprises:
   (1) diluting said formulation with said water; and
   (2) mixing said organic acid or salt thereof and the product of step (1).

33. The method of claim 31, wherein said mixing comprises:
   (1) diluting said organic acid or salt thereof with said water; and
   (2) mixing said formulation and the product of step (1).

34. The method of claim 31, wherein said mixing comprises:
   (1) diluting said organic acid or salt thereof with said water;
   (2) diluting said formulation with said water; and
   (3) mixing the product of step (1) and the product of step (2).

35. The method of claim 31, wherein said phosphite fertilizer has a pH of 5.0 to 7.0.

36. The method of claim 31, wherein said mixing further comprises:
   adjusting the pH of said phosphite fertilizer to between about 5.0 and about 7.0.

37. A method of providing phosphorus to a plant, said method comprising:
   (a) mixing water, at least one organic acid or salt thereof, and a formulation comprising at least one phosphite-containing compound, wherein said formulation comprises phosphorus in an amount equivalent to about 0.30 kg/L or greater $P_2O_5$, thus forming a phosphite fertilizer that is buffered, substantially fully solubilized, and has a foliage-acceptable pH for phosphorus uptake; and
   (b) applying said phosphite fertilizer to the foliage of said plant.

38. The method of claim 37, wherein said mixing comprises:
   (1) diluting said formulation with said water; and
   (2) mixing said organic acid or salt thereof and the product of step (1).

39. The method of claim 37, wherein said mixing comprises:
   (1) diluting said organic acid or salt thereof with said water; and
   (2) mixing said formulation and the product of step (1).

40. The method of claim 37, wherein said mixing comprises:
   (1) diluting said organic acid or salt thereof with said water;
   (2) diluting said formulation with said water; and
   (3) mixing the product of step (1) and the product of step (2).

41. The method of claim 37, wherein said phosphite fertilizer has a pH of 5.0 to 7.0.

42. The method of claim 37, said mixing further comprises:
   adjusting the pH of said phosphite fertilizer to between about 5.0 and about 7.0.

43. A method of providing phosphorus to a plant, comprising:
   (a) mixing water, at least one organic acid or salt thereof, and at least one formulation comprising a phosphorous-containing acid, wherein said phosphorous-containing acid is selected from the group consisting of phosphorous acid, hypophosphorous acid, polyphosphorous acid, polyhypophosphorous acid, and salts thereof, thus forming a phosphorus fertilizer with a pH less than about 2.5; and
   (b) applying said phosphorus fertilizer, through an irrigation system, to soil near said plant.

44. The method of claim 43, wherein said mixing comprises:
   (1) diluting said formulation with said water; and
   (2) mixing said organic acid or salt thereof and the product of step (1).

45. The method of claim 43, wherein said mixing comprises:
   (1) diluting said organic acid or salt thereof with said water; and
   (2) mixing said formulation and the product of step (1).

46. The method of claim 43, wherein said mixing comprises:
   (1) diluting said organic acid or salt thereof with said water;
   (2) diluting said formulation with said water; and
   (3) mixing the product of step (1) and the product of step (2).

47. A method of providing phosphorus to a plant, comprising:
   (a) mixing water, at least one organic acid or salt thereof, and at least one formulation comprising a phosphorous-containing acid, wherein said phosphorous-containing acid is selected from the group consisting of phosphorous acid, hypophosphorous acid, polyphosphorous acid, polyhypophosphorous acid, and salts thereof, and wherein said phosphorous-containing acid or salt thereof is present in said formulation in an amount of about 30 percent or greater (wt/vol), thus forming a phosphorus fertilizer with a pH less than about 2.5; and (b) applying said phosphorus fertilizer, through an irrigation system, to soil near said plant.

48. The method of claim 47, wherein said mixing comprises:

(1) diluting said formulation with said water; and (2) mixing said organic acid or salt thereof and the product of step (1).

49. The method claim 47, wherein said mixing comprises:

(1) diluting said organic acid or salt thereof with said water; and (2) mixing said formulation and the product of step (1).

50. The method of claim 47, wherein said mixing comprises:

(1) diluting said organic acid or salt thereof with said water;

(2) diluting said formulation with said water; and (3) mixing the product of step (1) and the product of step (2).

51. A method of providing phosphorus to a plant, comprising:

(a) mixing water, at least one organic acid or salt thereof, and at least one formulation comprising a phosphorous-containing acid, wherein said phosphorous-containing acid is selected from the group consisting of phosphorous acid, hypophosphorous acid, polyphosphorous acid, polyhypophosphorous acid, and salts thereof; and wherein said phosphorous-containing acid or salt thereof is present in said formulation in an amount of between about 30 percent and 46 percent (wt/vol), thus forming said phosphorus fertilizer with a pH less than 2.5; and (b) applying said phosphorus fertilizer, through an irrigation system, to soil near said plant.

52. The method of claim 51, wherein said mixing comprises:

(1) diluting said formulation with said water; and (2) mixing said organic acid or salt thereof and the product of step (1).

53. The method of claim 51, wherein said mixing comprises:

(1) diluting said organic acid or salt thereof with said water; and (2) mixing said formulation and the product of step (1).

54. The method of claim 51, wherein said mixing comprises:

(1) diluting said organic acid or salt thereof with said water;

(2) diluting said formulation with said water; and (3) mixing the product of step (1) and the product of step (2).

55. A method of making a phosphorus fertilizer, said method comprising:

(a) mixing water, at least one organic acid or salt thereof, and a formulation comprising at least one phosphorous-containing acid or salt thereof which is present in said formulation in an amount of from about 30 to about 40 percent (wt/vol), thus forming said phosphorus fertilizer, wherein said phosphorus fertilizer is buffered, substantially fully solubilized, and has a foliage-acceptable pH for phosphorus uptake.

56. The method of claim 55, wherein said mixing comprises:

(1) diluting said formulation with said water; and (2) mixing said organic acid or salt thereof and the product of step (1).

57. The method of claim 55, wherein said mixing comprises:

(1) diluting said organic acid or salt thereof with said water; and (2) mixing said formulation and the product of step (1).

58. The method of claim 55, wherein said mixing comprises:

(1) diluting said organic acid or salt thereof with said water;

(2) diluting said formulation with said water; and (3) mixing the product of step (1) and the product of step (2).

59. The method of claim 55, wherein said phosphorus fertilizer has a pH of 5.0 to 7.0.

60. The method of claim 55, wherein said mixing further comprises:

adjusting the pH of said phosphorus fertilizer to between about 5.0 and about 7.0.

61. A method of making a phosphorus fertilizer, said method comprising:

(a) mixing water, at least one organic acid or salt thereof, and a formulation comprising at least one phosphorous-containing acid or salt thereof which is present in said formulation in an amount of about 30 percent (wt/vol) or greater, thus forming said phosphorus fertilizer, wherein said phosphorus fertilizer is buffered, substantially fully solubilized, and has a foliage-acceptable pH for phosphorus uptake.

62. The method of claim 61, wherein said mixing comprises:

(1) diluting said formulation with said water; and (2) mixing said organic acid or salt thereof and the product of step (1).

63. The method of claim 61, wherein said mixing comprises:

(1) diluting said organic acid or salt thereof with said water; and (2) mixing said formulation and the product of step (1).

64. The method of claim 61, wherein said mixing comprises:

(1) diluting said organic acid or salt thereof with said water;

(2) diluting said formulation with said water; and (3) mixing the product of step (1) and the product of step (2).

65. The method of claim 61, wherein said phosphorus fertilizer has a pH of 5.0 to 7.0.

66. The method of claim 61, wherein said mixing further comprises:

adjusting the pH of said phosphorus fertilizer to between about 5.0 and about 7.0.

67. A method of making a phosphorus fertilizer, said method comprising:

(a) mixing water, at least one organic acid or salt thereof, and a formulation comprising at least one phosphorous-containing acid or salt thereof, wherein said formulation comprises phosphorus in an amount equivalent to from about 0.30 kg/L to about 0.40 kg/L $P_2O_5$, thus forming said phosphorus fertilizer, wherein said phosphorus fertilizer is buffered, substantially fully solubilized, and has a foliage-acceptable pH for phosphorus uptake.

68. The method of claim 67, wherein said mixing comprises:
(1) diluting said formulation with said water; and
(2) mixing said organic acid or salt thereof and the product of step (1).

69. The method of claim 67, wherein said mixing comprises:
(1) diluting said organic acid or salt thereof with said water; and
(2) mixing said formulation and the product of step (1).

70. The method of claim 67, wherein said mixing comprises:
(1) diluting said organic acid or salt thereof with said water;
(2) diluting said formulation with said water; and
(3) mixing the product of step (1) and the product of step (2).

71. The method claim 67, wherein said phosphorus fertilizer has a pH of 5.0 to 7.0.

72. The method of claim 67, wherein said mixing further comprises:
adjusting the pH of said phosphorus fertilizer to between about 5.0 and about 7.0.

73. A method of making a phosphorus fertilizer, said method comprising:
(a) mixing water, at least one organic acid or salt thereof, and a formulation comprising at least one phosphorous-containing acid or salt thereof, wherein said formulation comprises phosphorus in an amount equivalent to about 0.30 kg/L or greater $P_2O_5$, thus forming said phosphorus fertilizer, wherein said phosphorus fertilizer is buffered, substantially fully solubilized, and has a foliage-acceptable pH for phosphorus uptake.

74. The method of claim 73, wherein said mixing comprises:
(1) diluting said formulation with said water; and
(2) mixing said organic acid or salt thereof and the product of step (1).

75. The method of claim 73, wherein said mixing comprises:
(1) diluting said organic acid or salt thereof with said water; and
(2) mixing said formulation and the product of step (1).

76. The method of claim 73, wherein said mixing comprises:
(1) diluting said organic acid or salt thereof with said water;
(2) diluting said formulation with said water; and
(3) mixing the product of step (1) and the product of step (2).

77. The method of claim 73, wherein said phosphorus fertilizer has a pH of 5.0 to 7.0.

78. The method of claim 73, wherein said mixing further comprises:
adjusting the pH of said phosphorus fertilizer to between about 5.0 and about 7.0.

79. A method of making a phosphite fertilizer, said method comprising:
(a) mixing water, at least one organic acid or salt thereof, and a formulation comprising at least one phosphite-containing compound, wherein said formulation comprises phosphorus in an amount equivalent to about 0.30 kg/L or greater $P_2O_5$, thus forming said phosphite fertilizer, wherein said phosphite fertilizer is buffered, substantially fully solubilized, and has a foliage-acceptable pH for phosphorus uptake.

80. The method of claim wherein said mixing comprises:
(1) diluting said formulation with said water; and
(2) mixing said organic acid or salt thereof and the product of step (1).

81. The method of claim 79, wherein said mixing comprises:
(1) diluting said organic acid or salt thereof with said water; and
(2) mixing said formulation and the product of step (1).

82. The method of claim 79, wherein said mixing comprises:
(1) diluting said organic acid or salt thereof with said water;
(2) diluting said formulation with said water; and
(3) mixing the product of step (1) and the product of step (2).

83. The method of claim 79, wherein said phosphite fertilizer has a pH of 5.0 to 7.0.

84. The method of claim 79, wherein said mixing further comprises:
adjusting the pH of said phosphite fertilizer to between about 5.0 and about 7.0.

85. A method of making a phosphite fertilizer, said method comprising:
(a) mixing water, at least one organic acid or salt thereof, and a formulation comprising at least one phosphite-containing compound, wherein said formulation comprises phosphorus in an amount equivalent to from about 0.30 kg/L to 0.40 kg/L or greater $P_2O_5$, thus forming said phosphite fertilizer, wherein said phosphite fertilizer is buffered, substantially fully solubilized, and has a foliage-acceptable pH for phosphorus uptake.

86. The method of claim 85, wherein said mixing comprises:
(1) diluting said formulation with said water; and
(2) mixing said organic acid or salt thereof and the product of step (1).

87. The method of claim 85, wherein said mixing comprises:
(1) diluting said organic acid or salt thereof with said water; and
(2) mixing said formulation and the product of step (1).

88. The method of claim 85, wherein said mixing comprises:
(1) diluting said organic acid or salt thereof with said water;
(2) diluting said formulation with said water; and
(3) mixing the product of step (1) and the product of step (2).

89. The method of claim 85, wherein said phosphite fertilizer has a pH of 5.0 to 7 0.

90. The method of claim 85, wherein said mixing further comprises:
adjusting the pH of said phosphite fertilizer to between about 5.0 and about 7.0.

91. A method of making a phosphite fertilizer, said method comprising:

(a) mixing water, at least one organic acid or salt thereof, and a formulation comprising at least one phosphite-containing compound, wherein said formulation comprises phosphorus in an amount equivalent to about 0.30 kg/L or greater $P_2O_5$, thus forming said phosphite fertilizer, wherein said phosphite fertilizer is buffered, substantially fully solubilized, and has a foliage-acceptable pH for phosphorus uptake.

92. The method of claim 91, wherein said mixing comprises:

(1) diluting said formulation with said water; and
(2) mixing said organic acid or salt thereof and the product of step (1).

93. The method of claim 91, wherein said mixing comprises:

(1) diluting said organic acid or salt thereof with said water; and
(2) mixing said formulation and the product of step (1).

94. The method of claim 91, wherein said mixing comprises:

(1) diluting said organic acid or salt thereof with said water;
(2) diluting said formulation with said water; and
(3) mixing the product of step (1) and the product of step (2).

95. The method of claim 91, wherein said phosphite fertilizer has a pH of 5.0 to 7.0.

96. The method of claim 91, wherein said mixing further comprises:

adjusting the pH of said phosphite fertilizer to between about 5.0 and about 7.0.

97. A method of making a phosphorus fertilizer with a pH less than 2.5, comprising:

(a) mixing water, at least one organic acid or salt thereof, and at least one formulation comprising a phosphorous-containing acid, wherein said phosphorous-containing acid is selected from the group consisting of phosphorous acid, hypophosphorous acid, polyphosphorous acid, polyhypophosphorous acid, and salts thereof, thus forming said phosphorus fertilizer.

98. The method of claim 97, wherein said mixing comprises:

(1) diluting said formulation with said water; and
(2) mixing said organic acid or salt thereof and the product of step (1).

99. The method of claim 97, wherein said mixing comprises:

(1) diluting said organic acid or salt thereof with said water; and
(2) mixing said formulation and the product of step (1).

100. The method of claim 97, wherein said mixing comprises:

(1) diluting said organic acid or salt thereof with said water;
(2) diluting said formulation with said water; and
(3) mixing the product of step (1) and the product of step (2).

101. A method of making a phosphorus fertilizer with a pH less than 2.5, comprising:

(a) mixing water, at least one organic acid or salt thereof, and at least one formulation comprising a phosphorous-containing acid, wherein said phosphorous-containing acid is selected from the group consisting of phosphorous acid, hypophosphorous acid, polyphosphorous acid, polyhypophosphorous acid, and salts thereof, and where in said phosphorous-containing acid or salt thereof is present in said formulation in an amount of about 30 percent or greater (wt/vol), thus forming said phosphorus fertilizer.

102. The method of claim 101, wherein said mixing comprises:

(1) diluting said formulation with said water; and
(2) mixing said organic acid or salt thereof and the product of step (1).

103. The method of claim 101, wherein said mixing comprises:

(1) diluting said organic acid or salt thereof with said water; and
(2) mixing said formulation and the product of step (1).

104. The method of claim 101, wherein said mixing comprises:

(1) diluting said organic acid or salt thereof with said water;
(2) diluting said formulation with said water; and
(3) mixing the product of step (1) and the product of step (2).

105. A method of making a phosphorus fertilizer with a pH less than 2.5, comprising:

(a) mixing water, at least one organic acid or salt thereof, and at least one formulation comprising a phosphorous-containing acid, wherein said phosphorous-containing acid is selected from the group consisting of phosphorous acid, hypophosphorous acid, polyphosphorous acid, polyhypophosphorous acid, and salts thereof, and wherein said phosphorous-containing acid or salt thereof is present in said formulation in an amount of between about 30 percent and 46 percent (wt/vol), thus forming said phosphorus fertilizer.

106. The method of claim 105, wherein said mixing comprises:

(1) diluting said formulation with said water; and
(2) mixing said organic acid or salt thereof and the product of step (1).

107. The method of claim 105, wherein said mixing comprises:

(1) diluting said organic acid or salt thereof with said water; an
(2) mixing said formulation and the product of step (1).

108. The method of claim 105, wherein said mixing comprises:

(1) diluting said organic acid or salt thereof with said water;
(2) diluting said formulation with said water; and
(3) mixing the product of step (1) and the product of step (2).

* * * * *